(12) United States Patent
Ijzerman et al.

(10) Patent No.: US 7,626,643 B2
(45) Date of Patent: Dec. 1, 2009

(54) WAVEGUIDE FOR AUTOSTEREOSCOPIC DISPLAY HAVING A PLURALITY OF SWITCHABLE PORTIONS OF DIFFUSIVE MATERIAL WITHIN THE WAVEGUIDE FOR PROVIDING EITHER SCATTERING OR LIGHT-TRANSMISSIVE LIGHT TO THE DISPLAY

(75) Inventors: Willem L. Ijzerman, Eindhoven (NL); Martin J. J. Jak, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 336 days.

(21) Appl. No.: 10/578,071

(22) PCT Filed: Nov. 3, 2004

(86) PCT No.: PCT/IB2004/052287

§ 371 (c)(1),
(2), (4) Date: May 2, 2006

(87) PCT Pub. No.: WO2005/045488

PCT Pub. Date: May 19, 2005

(65) Prior Publication Data

US 2007/0091638 A1  Apr. 26, 2007

(30) Foreign Application Priority Data

Nov. 7, 2003  (GB) ................... 0326005.6

(51) Int. Cl.
*G02F 1/1335* (2006.01)

(52) U.S. Cl. .................... 349/15; 349/64; 349/65; 349/66

(58) Field of Classification Search ............ 349/15, 349/64, 65, 66
See application file for complete search history.

(56) References Cited

U.S. PATENT DOCUMENTS

| 5,099,343 | A  | * | 3/1992 | Margerum et al. | ........... | 349/63 |
| 6,222,598 | B1 | * | 4/2001 | Hiyama et al. | ................ | 349/65 |
| 6,437,915 | B2 | * | 8/2002 | Moseley et al. | ............ | 359/465 |
| 6,618,104 | B1 | * | 9/2003 | Date et al. | .................... | 349/86 |
| 2002/0018158 | A1 | * | 2/2002 | Putilin | ........................ | 349/62 |
| 2003/0067563 | A1 | * | 4/2003 | Tomono | ..................... | 349/15 |

* cited by examiner

Primary Examiner—John Heyman

(57) ABSTRACT

A display includes a display panel and a backlighting system having a light source and waveguide. The waveguide includes diffusing portions of diffusing material. Light propagates through the waveguide by total internal reflection, but may be scattered by the diffusing portions. Scattered light leaving the waveguide through its exit face produces a pattern of light lines for use in illuminating a 3D autostereoscopic image displayed by the display panel. Intervening portions between the diffusing portions, are formed from a material that can be switched between a light transmissive state and a diffusive state. Optical properties of the intervening portions are controlled using electric fields. Such a display is switchable between a 2D image mode, in which the intervening portions are diffusive and the waveguide provides uniform illumination, and a 3D image mode, in which the intervening portions are transmissive and the waveguide provides illumination in the form of light lines.

23 Claims, 9 Drawing Sheets

WAVEGUIDE FOR AUTOSTEREOSCOPIC DISPLAY HAVING A PLURALITY OF SWITCHABLE PORTIONS OF DIFFUSIVE MATERIAL WITHIN THE WAVEGUIDE FOR PROVIDING EITHER SCATTERING OR LIGHT-TRANSMISSIVE LIGHT TO THE DISPLAY

The present invention relates to a waveguide for use in an autostereoscopic display device.

Light shutter display devices, such as liquid crystal displays (LCDs), in which a backlight is modulated on a pixel-by-pixel basis using a liquid crystal matrix, are well-known. Such devices generally produce a two-dimensional (2D) image. However, rapid progress has been made in the research and development of three-dimensional (3D) displays. For reasons of cost effectiveness and user convenience, display systems that do not require the user to wear special glasses in order to perceive a 3D image have been developed. Such display systems are called autostereoscopic displays.

Autostereoscopic displays typically comprise a conventional display panel, such as an LCD, together with means for providing a pair of images, in which one image is seen by a viewer's left eye and the other is seen by the viewer's right eye. For example, a 3D image can be produced using an array of semi-cylindrical lenses placed in front of the display panel, where the lenses focus light from different columns of pixels or sub-pixels to different regions of space so that a viewer standing at a predetermined distance from the display panel will perceive a 3D image.

A simpler method for presenting 3D images is the parallax barrier technique. Referring to FIG. 1, a conventional barrier-type autostereoscopic display 1 comprises a display panel 2, a backlight 3 and a barrier 4. Typically, the barrier 4 is an opaque screen with a pattern of parallel transparent lines or slits 5a to 5d and is placed between the backlight 3 and display panel 2 or, alternatively, positioned in front of the display panel 2. When in use, light emitted by the backlight 3 is transmitted through the slits 5a to 5d of the barrier 4, so that the display panel 2 is illuminated by what is effectively a plurality of narrow elongate light sources. Alternate columns of sub-pixels of the display panel 2 are driven to display a left-eye image A and a right-eye image B respectively. The sub-pixels have a pitch $p_d$ and the display panel 2 is positioned a distance c from the barrier 4, such that each "elongate light source" illuminates one pair of sub-pixel columns. When the display 1 is used by a viewer 6 at a distance d from the display panel 2, the user's left and right eyes perceives the left-eye and right-eye images A, B respectively.

In the case of an autosteroscopic display having two views A, B, a displayed 3D image can only be viewed from one perspective. For example, where the 3D image represents an object, the image displayed represents the object when viewed from one angle. However, it is possible for a display to show the object from more than one perspective. In order to provide a 3D image that is viewable from multiple perspectives, more views C, D etc. are required. The relationship between the pitch of the line sources $p_l$ and the number of views m as follows, $$P_l = \frac{a \cdot p_d}{a - p_d} m \approx p_d \cdot m \qquad [1]$$

where $p_d$ is the pitch of the sub-pixels and a is the required parallax between each view at the position of the user. The relationship between the viewing distance d, the parallax a and the barrier-to-panel distance c is given by equation 2, $$a \approx \frac{d}{c} \cdot p_d \qquad [2]$$

Displays that can switch between 2D and 3D imaging modes, have been devised. However, where such a display includes a physical barrier, it may be necessary to include a switchable diffuser 7 between the barrier 4 and display panel 2. When the display 1 is used in a 3D imaging mode, the diffuser 7 is switched into a transmissive state to allow light transmitted by the slits 5a to 5d to pass through. In a 2D imaging mode, the diffuser 7 is switched into a diffusing state, so that light from the backlight 3 is scattered and the display panel 2 is uniformly illuminated.

However, barrier type displays are inefficient, as a significant proportion of the light generated by the backlight 3 is lost. For instance, in 2D imaging modes, a significant proportion of the light may be scattered away from the display panel 2. In 3D mode, the light that does not enter the slits 5a to 5d is lost.

The invention is intended to achieve one or more of the following objects: the provision of a parallax barrier that does not require a separate diffusing element, the provision of a display that is capable of producing both 2D and 3D images in a flexible manner, the presentation of 3D images to a viewer without restricting the viewer to a particular position with respect to the display panel and the production of 2D and 3D images with greater light efficiency.

According to a first aspect of the invention, a waveguide for use in illuminating a display panel comprises a first face arranged to receive light from a light source and an exit face through which light may exit the waveguide and is configured so that, in use, light enters the waveguide through said first face, is scattered by a plurality of portions of diffusing material located within the waveguide and leaves the waveguide through the exit face. The light leaving the waveguide through the exit face may form a pattern of light lines, providing suitable illumination for 3D images in a light efficient manner.

Preferably, at least one of the portions is switchable between a state in which it is predominantly light-transmissive and a state in which it is predominantly diffusive. This allows the waveguide to be switched between a mode in which uniform illumination for a 2D image is produced and another mode providing light lines for 3D imaging. Alternatively, or additionally, the waveguide may be arranged so that light passing through a first region of the exit face produces uniform illumination while light passing through a second region of the exit face produces a pattern of light lines, to provide appropriate illumination for 2D and 3D images displayed simultaneously by the display panel.

Where the optical properties of the portions change in response to the application or removal of an electric field, the waveguide may comprise a plurality of electrodes for use in switching the portions between these states. The electrodes may include a set of column electrodes. These may be used in conjunction with a set of row electrodes, so that the portions can be controlled using passive matrix addressing. Alternatively, a two-dimensional array of electrodes may be provided, in which case an active matrix may be used to apply electric fields to selected portions.

In order to further improve light efficiency, the waveguide may comprise a reflective surface arranged to reflect light scattered by at least one portion in a direction leading away from the exit face.

Suitable diffusing material for forming the portions include liquid crystal material, including liquid crystal gels. Where the portions are non-switchable, other scattering elements, such as titanium oxide particles, may be used, which may have greater scattering efficiency. The waveguide may form part of an illumination system for a display panel within a display.

Such a display, if comprising a waveguide with switchable portions, may also comprise an arrangement for determining the position of a viewer, means for switching one or more of the portions in order to vary the position of the light lines according to the detected position of the viewer and means for adjusting an image displayed on the display panel according to the detected position of the viewer. This permits the display of a 3D image without requiring the viewer to be located in, and therefore remain in, a particular position with respect to the display.

This aspect also provides a communication device, a computing device and audio/visual equipment comprising such a display. According to a second aspect of the invention, a method of presenting an image comprises displaying an image on a display panel and providing backlighting for the display panel using a light source and a waveguide, wherein said waveguide comprises a layer of diffusive material and the step of providing backlighting comprises setting the optical properties of at least one portion of the layer of diffusive material.

The step of setting optical properties comprises applying a potential difference across said at least one portion, in order to switch at least one portion of the layer of diffusive material between a state in which said portion is predominantly light-transmissive and a state in which said portion is predominantly diffusive.

The optical properties of said portions may be set so that said backlighting comprises a plurality of light lines for illuminating a 3D image or set to produce uniform illumination for illuminating a 2D image. The illumination system may be switchable between 2D and 3D modes and/or arranged to provide illumination for simultaneous display of 2D and 3D images on the display panel.

When the display is arranged to present a 3D image, the method may further comprise determining a position of a viewer and adjusting the image and pattern of light lines accordingly.

Embodiments of the invention will now be described, by way of example, with reference to the accompanying drawings, in which.

Figure 2:
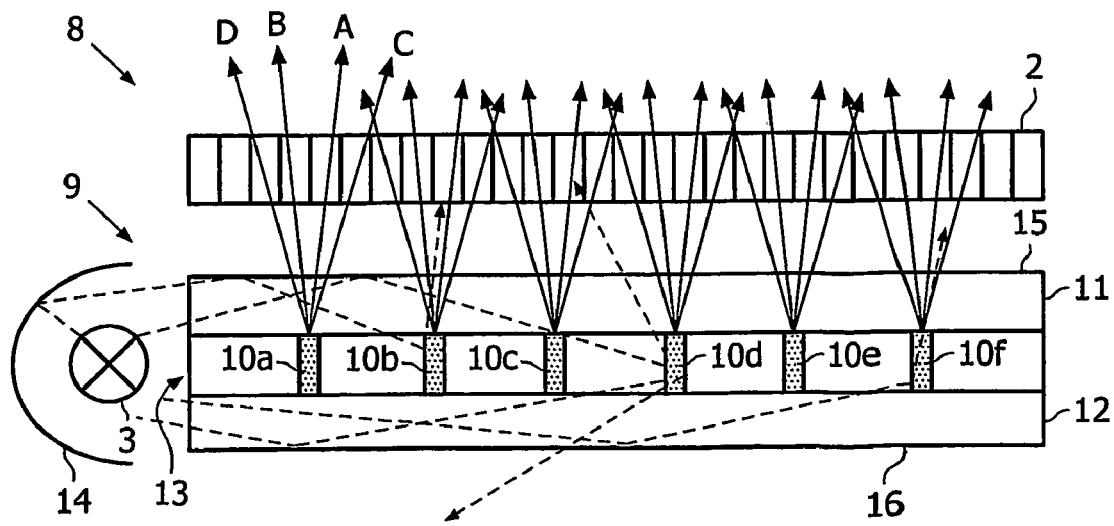
FIG. 2 is a schematic diagram of a display comprising a waveguide according to a first embodiment of the invention.

FIG. 2 depicts a display 8, comprising a display panel 2 and an illumination system comprising a backlight 3, such as a fluorescent rod lamp, and a waveguide 9.

In this example, the display panel 2 comprises a layer of electro-optically active material, such as a liquid crystal material, sandwiched between two light-transmissive substrates (not shown). In the case of a liquid crystal layer, the operation of the layer may be based on, for example, a twisted nematic (TN), super-twisted nematic (STN), vertically aligned nematic (VAN), optically compensated birefringence (OCB), in-plane switching nematics (IPS) or ferro-electric effect for modulating a polarisation direction of incident light. The display panel 2 is subdivided into an array of pixels and is provided with an active matrix or a passive matrix arrangement (not shown) for driving the pixels to allow an image to be displayed in a manner well known per se.

The waveguide 9 comprises an array of portions 10a to 10f of a diffusing material. Examples of suitable diffusive materials include a polymer dispersed liquid crystal (PDLC), which is diffusive in the absence of an electric field and plastics material containing particles of another material for scattering incident light, such as Polymethyl methacrylate (PMMA) containing embedded titanium oxide particles.

The diffusing portions 10a to 10f are separated by non-diffusing regions, which comprise a transparent material that is free from scattering particles. The diffusing portions 10a to 10f are sandwiched between substrates 11, 12. The substrates 11, 12 are made from a transparent material such as, for example, glass, silicon dioxide ($SiO_2$), quartz or a suitable plastic material. Preferably, the refractive indices of the non-diffusing regions and substrates 11, 12 are substantially equal.

An end face 13 of the waveguide 9 is arranged to receive light emitted by the light source 3 either directly or, where provided, reflected by an associated reflector 14. Light propagates through the waveguide 9 and is reflected, by total internal reflection, at the outer faces of the substrates 11, 12. However, light incident on a diffusing portion 10a to 10f is scattered in a random direction and may leave the waveguide 9 through an exit face 15 that is arranged to face the display panel 2. The light that leaves the waveguide 9 through exit face 15 forms a pattern of light lines that illuminate the display panel 2. Examples of paths followed by light within the waveguide 9 are shown using dotted lines in FIG. 2.

In this particular example, each diffusing portion 10a to 10f causes a column of four pixels in the display panel 2 to be illuminated. Each of the pixels within the column may present a different view, for example, views A, B, C and D, so that a viewer positioned at a suitable location may perceive a 3D image by registering an appropriate pair of views.

The diffusing portions 10a to 10f in the waveguide 9 of FIG. 2 produce a pattern of light lines by scattering light from the light source 3. Light may continue to propagate through the waveguide 9 until it is scattered by a diffusing portion and exits the waveguide through one of the exit face 15, a face 16 of the substrate 12 remote from the display panel 2 or an end face, for example, end face 13, of the waveguide 9. In spite of the light loss through the various faces of the waveguide 9 other than the exit face, the light efficiency of the waveguide 9 compares favourably with the prior art arrangement of FIG. 1, in which light lines are formed by blocking and discarding unwanted light. The waveguide 9 of FIG. 2 is configured for use in producing 3D images and cannot be used for 2D imaging. A switchable 2D/3D display 17 is shown in FIG. 3, which includes a waveguide 18 according to a second embodiment of the invention.

Figure 3:
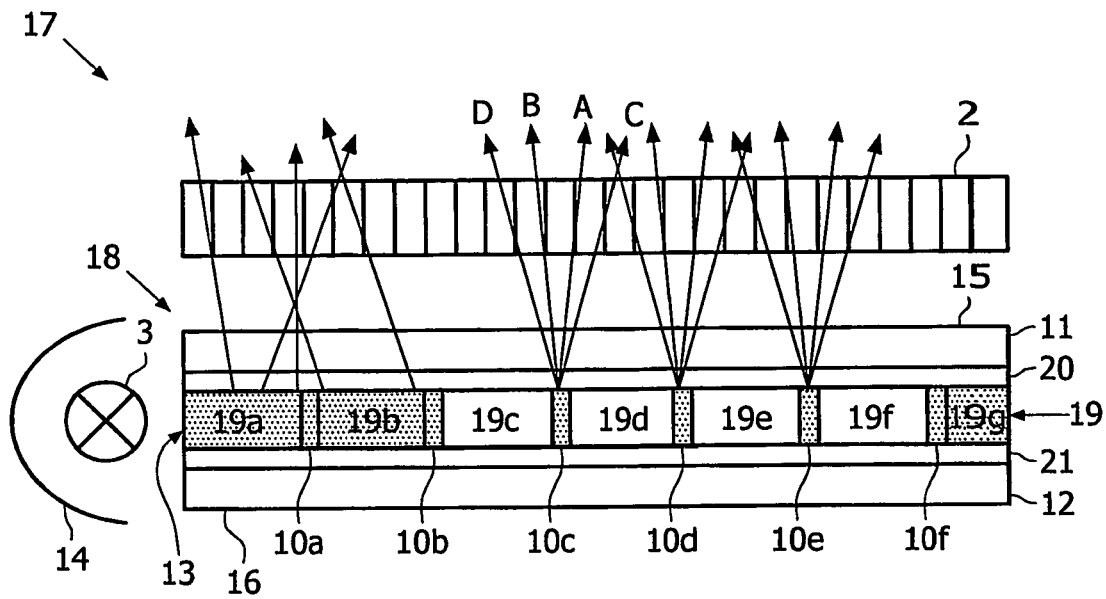
FIG. 3 is a schematic diagram of a display in a 3D imaging mode comprising a waveguide according to a second embodiment of the invention.

In FIG. 3, the waveguide 18 comprises diffusing portions 10a to 10f sandwiched between transparent substrates 11, 12 and is arranged to guide light emitted by a light source 3 entering through an end face 13 of the waveguide 18 towards a display panel 2 in a similar manner to that discussed in relation to the first embodiment.

However, the waveguide 18 differs from the waveguide 9 of FIG. 2 in comprising a continuous layer 19 of switchable diffusing material. In this particular embodiment, the diffusing material is a liquid crystal (LC) gel and the layer has a thickness in the range of 6 to 18 μm. The LC gel comprises the following components:

A liquid crystal blend. This may be a commercially available LC blend, for example, BL109 commercialised by Merck (RTM), and/or may have a large birefringence to enhance its scattering properties;

A liquid crystalline monomer, such as those described in D. J. Broer et al., 1989, Makromol. Chem. 190, 3201-3215 and in D. J. Broer, "Photoinitiated polymerization and crosslinking of liquid-crystalline systems", Radiation Curing Polym. Si. Technol. (ed. J-P. Fouassier, J. Rabek), 1993, volume 3, 383-443. One suitable example is a liquid crystalline diacrylate with the following chemical structure, at a concentration of between 6 and 12 Wt %:

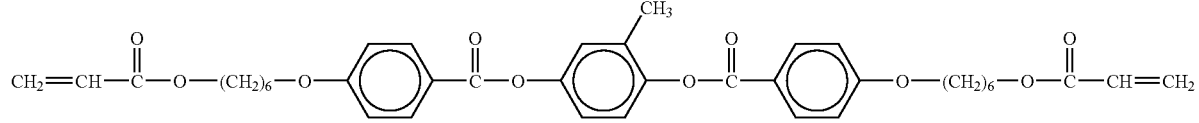

a photoinitiator, for example, Irgacure 651, manufactured by Ciba Geigy®. The amount is normally about 1% calculated on the amount of reactive monomer.

The LC gel is formed by photopolymerisation of these components. Before photo-polymerisation, the blend is aligned at a surface alignment layer and is transparent. After photopolymerisation, by exposure to ultra-violet (UV) light, a polymer network micro-phase separates, comprising polymer network molecules having the same alignment and preferably the same optical properties, that is, similar ordinary and extraordinary refractive indices. This micro-phase, a so-called LC gel, is transparent.

If an electric field is applied to the LC gel, liquid crystal that did not react when exposed to the UV light responds by adopting an orientation different to that of the polymer network molecules. Therefore, the refractive index of the LC gel becomes inhomogeneous. Multi-domains may be formed in the unphotopolymerised liquid crystal. The refractive index transitions within the LC gel, result in scattering of incident light. The voltage required to switch the LC gel into a diffusive state is between 60 and 120 Volts, depending on the thickness of the layer 19.

In an alternative embodiment, the diffusing layer 19 may be formed from a PDLC, which is diffusive in the absence of an electric field but becomes transparent when a voltage is applied. However, it is noted that, when in a transparent state, an LC gel layer 19 may be less diffusive than a PDLC layer, resulting in a higher transmittance. In addition, the time required for an LC gel to respond to an electric field may be of the order of milliseconds and compares favourably with typical PDLC materials, which may switch with rates of tens of milliseconds.

Figure 4:
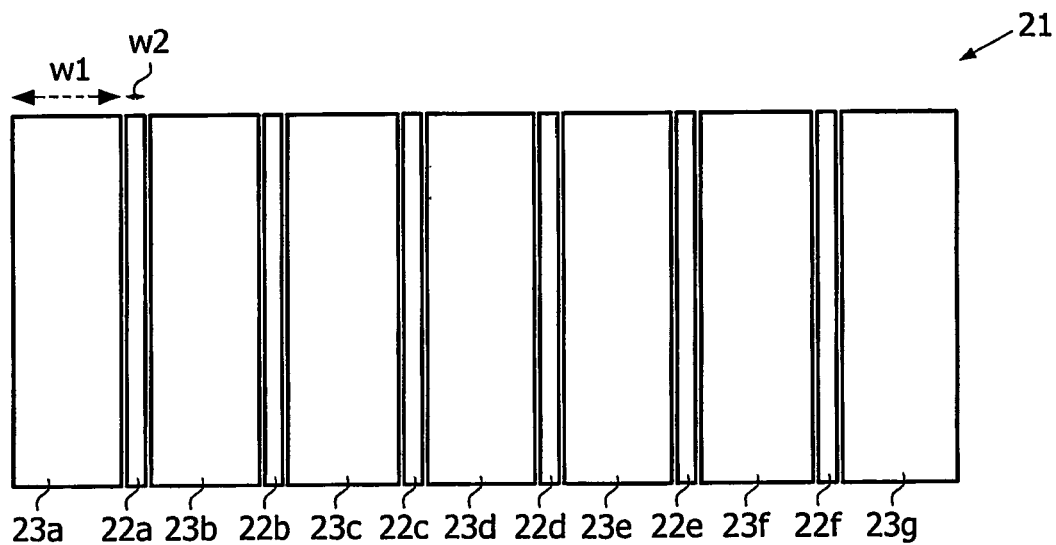
FIG. 4 is a plan view of an array of column electrodes provided in the waveguide of the second embodiment.
Figure 5:
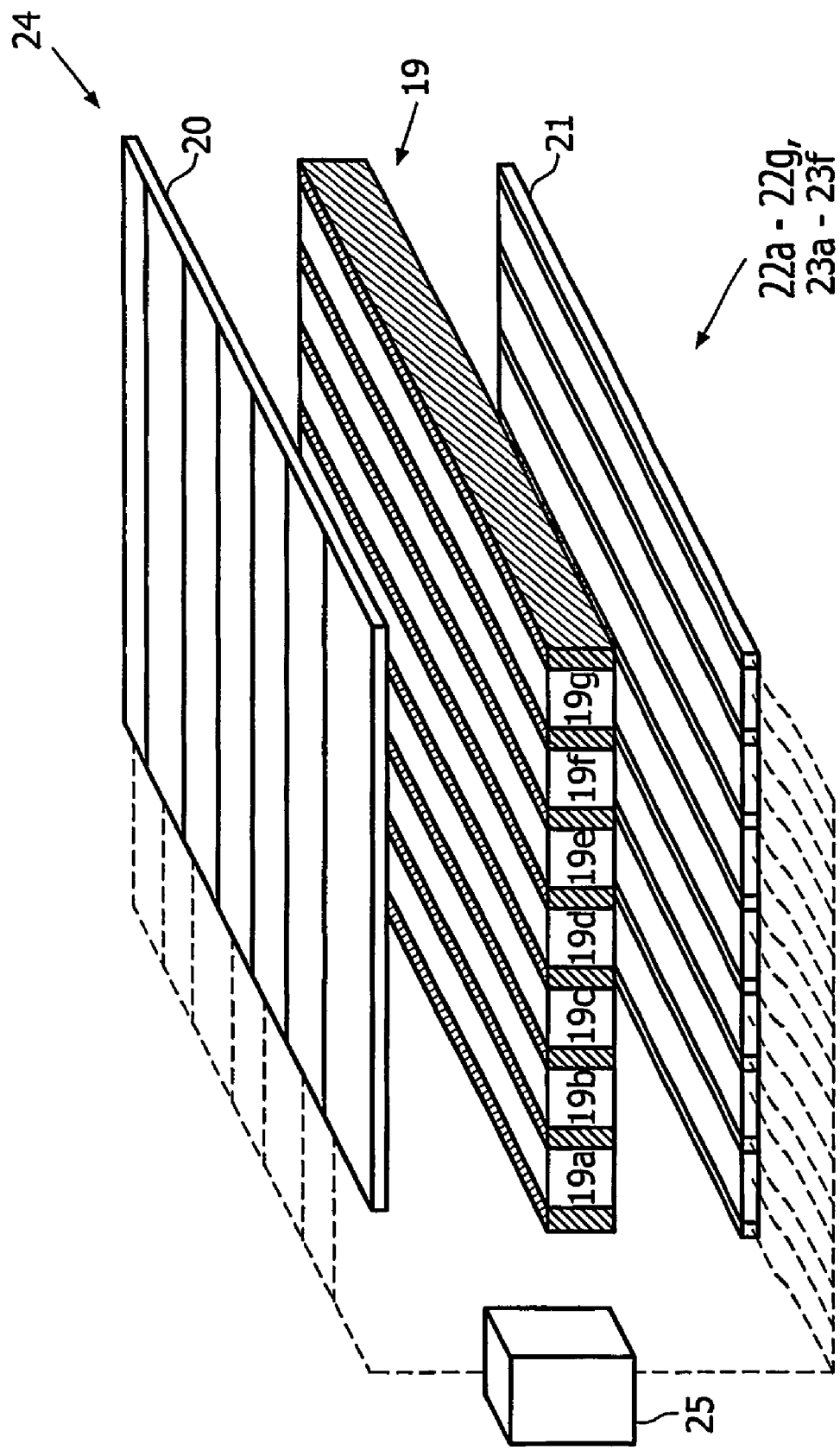
FIG. 5 is an exploded perspective view of a diffusing layer and electrodes in the waveguide of the second embodiment.

The waveguide 18 is arranged so that portions 10a to 10f, 19a to 19g of the continuous diffusive layer 19 can be switched between a transparent state and a diffusing state using a passive matrix addressing arrangement. To this end, the substrates 11, 12 are coated with a layer of transparent conducting material 20, 21, such as indium tin oxide (ITO). Each ITO layer 20, 21 is configured to form an array of electrodes, as shown in FIGS. 4 and 5. For example, in this embodiment, a plurality of column electrodes 22a to 22f, 23a to 23g is defined in ITO layer 21. A set of row electrodes, indicated generally by 24, is defined in the other ITO layer 20. A drive unit 25 is provided for applying voltages to the electrodes 22a to 22f, 23a to 23g, 24.

Therefore, a region 10a to 10f, 19a to 19g of the diffusive layer 19 may be switched into, or maintained in, a diffusive state by applying an electric field using the appropriate column electrode 23a to 23f and one or more of the row electrodes 24. In this particular example, one set of column electrodes 22a to 22f is configured for use in producing a pattern of light lines for 3D imaging. The sizes and positions of the column electrodes 22a to 22f are arranged to correspond to portions 10a to 10f of the switchable layer 19, which are then maintained in a diffusive state. The diffusive portions 10a to 10f act on light entering the waveguide 18 in the same manner as described in relation to the first embodiment.

Figure 6:
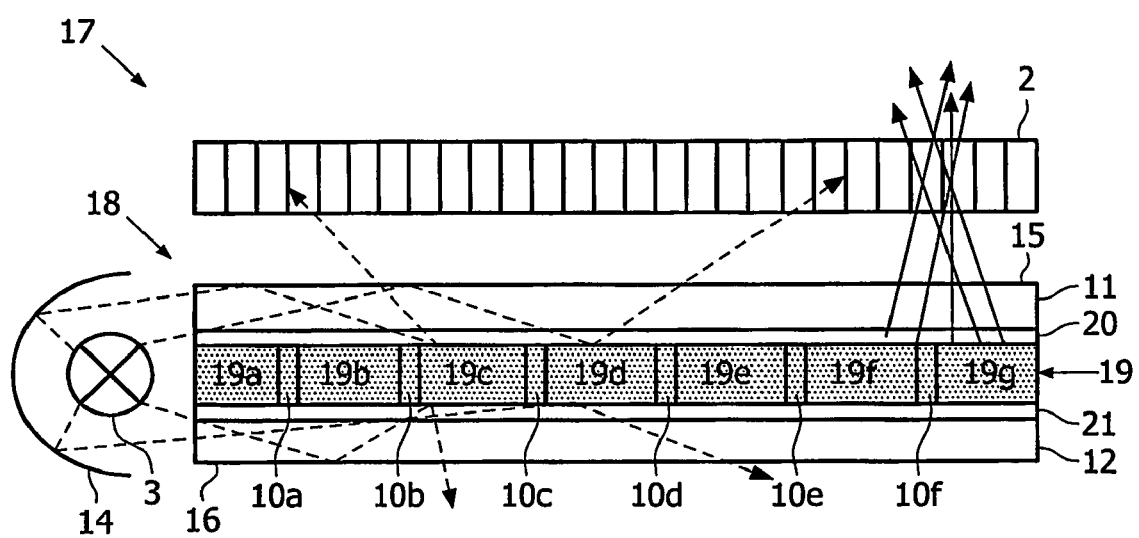
FIG. 6 is a schematic diagram of the waveguide of the second embodiment when the display of FIG. 3 is in a 2D imaging mode.

The state of portions 19a to 19g of the diffusive layer 19, located adjacent to, and between, portions 10a to 10f, can be controlled using electrodes 23a to 23g. When the display is in a 3D imaging mode, no electric field is applied, the switchable portions 19a to 19g are light-transmissive, and light lines are produced by the waveguide 18. However, by applying an electric field using one or more of electrodes 23a to 23g and at least one row electrode 24, the switchable portions 19a to 19g can be switched into a diffusive state. When all the switchable portions 19a to 19g are diffusive, as shown in FIG. 6, uniform backlighting for the display panel 2 is produced as light is scattered by all regions 10a to 10f, 19a to 19g of the diffusive layer 19. The dimensions of the electrodes 22a to 22f and 23a to 23g and, therefore, the portions 10a to 10f, 19a to 19g are selected so that cross-talk between views A, B, C, D is limited to an acceptable level. In this particular example, the electrodes 23a to 23g have a width w1 of approximately 405 μm, while electrodes 22a to 22f have a width w2 of approximately 50 μm. However, the dimensions used in other embodiments of the invention will depend on the type of display 16 and its pixel size. As a general guide, the electrodes 22a to 22f and 23a to 23g are configured to produce light lines with a width selected from a range of 10 to 800 μm with a pitch of between 100 μm to 10 mm. The width of the light line will be less than, or equal to, half the pitch in order to limit cross-talk.

The alignment of the liquid crystal within the diffusing layer 19 in the absence of an electric field may be parallel or perpendicular to a propagating wave in the waveguide or perpendicular to the surface of the ITO layers 20, 21. If an arrangement in which the alignment is perpendicular to the ITO layers 20, 21 is required, the LC gel must have a net negative dielectric anisotropy.

The display 17 may be used to show 2D and 3D images simultaneously. For example, in FIG. 4, switchable portions 19a, 19b, 19g are in a diffusive state and so, together with diffusive portions 10a, 10b, 10f, produce uniform illumination, while switchable portions 19c, 19d, 19e, 19f are light-transmissive, so that light lines are produced in a limited area of the exit face 15, by diffusive portions 10c, 10d and 10e.

Figure 7:
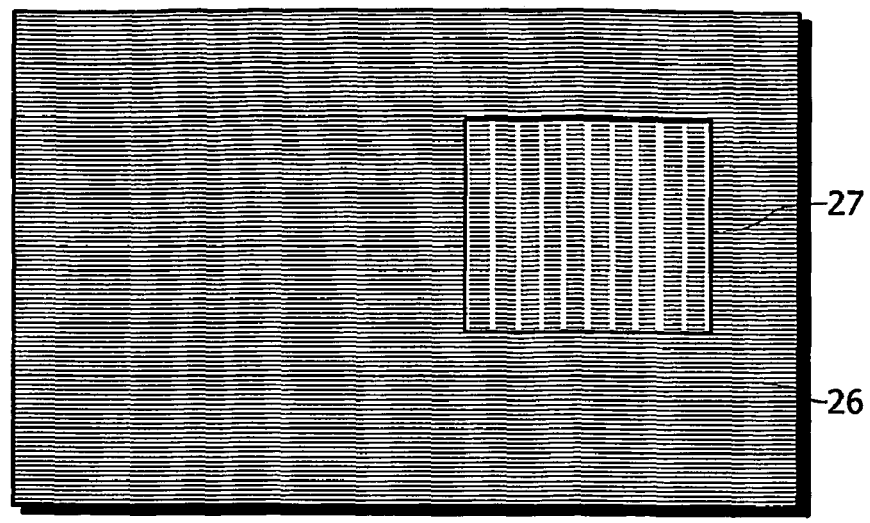
FIG. 7 illustrates the light pattern produced by the waveguide of the second embodiment, when arranged to simultaneously display 2D and 3D images.
Figure 8:
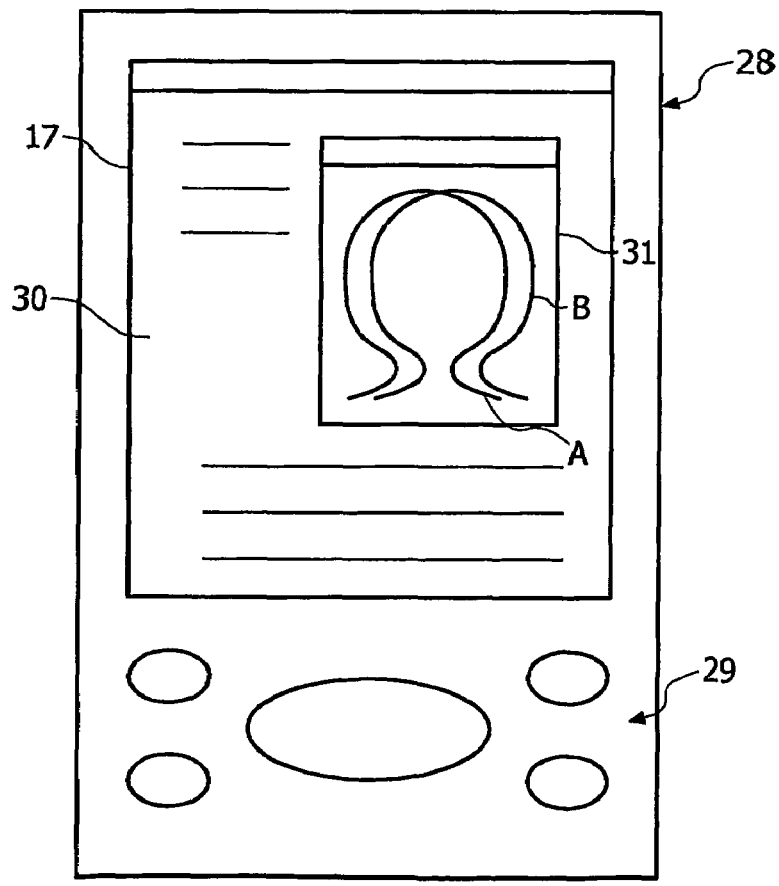
FIG. 8 is a schematic diagram of a personal digital assistant incorporating the display of FIG. 3.

Furthermore, by applying a voltage to selected row electrodes 24, the area in which light lines are produced can be limited in two dimensions, so that the display 16 can present a 3D image "window" within a 2D image. FIG. 7 shows a pattern of light emitted by the waveguide 18, comprising a first area 26 of uniform illumination for one or more 2D images and a second area 27 comprising light lines for 3D images. Referring to FIG. 8, the display 17 may be incorporated in a device such as a PDA 28, in a user interface that further comprises keys 29, is used to present a 2D image 30, such as text and/or wallpaper, and a 3D picture image 31 simultaneously. The 3D image comprises multiple views A, B.

Although FIG. 5 shows an arrangement in which the row electrodes 24 are provided by ITO layer 20 closest to the exit face 15 and column electrodes 22a to 22f, 23a to 23g are provided by ITO layer 21, a waveguide comprising this type of electrode structure can be devised in which the row electrodes 24 are provided by ITO layer 21 and the column electrodes 22a to 22f, 23a to 23g by the ITO layer 20.

Figure 9:
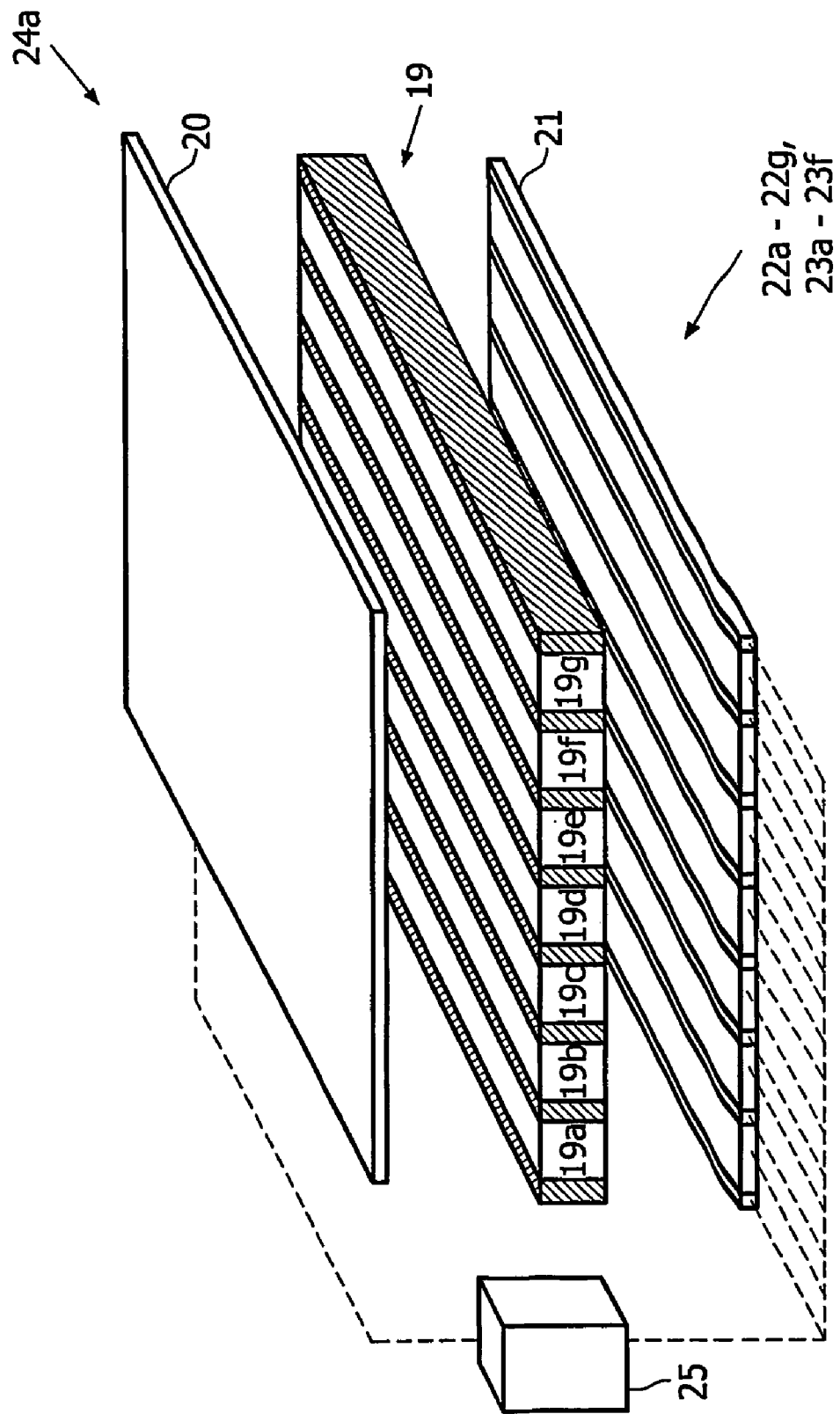
FIG. 9 is an exploded perspective view of a diffusing layer and electrodes in a waveguide according to a third embodiment of the invention.

Furthermore, it is not essential to provide an array of row electrodes 24. FIG. 9 shows a diffusing layer 19 and ITO layers 20, 21 for use in a waveguide, not shown, according to a third embodiment of the invention. In this arrangement, a single, unstructured, electrode 24a is provided by the ITO layer 20. As in the second embodiment, a drive unit 25 applies voltages to selected electrodes 22a to 22f, 23a to 23g, 24a in order to control the optical properties of various regions 10a to 10f, 19a to 19g of the diffusive layer 19. The diffusive layer 19 is capable of providing illumination for 2D and 3D images simultaneously, by switching regions 19a to 19g accordingly. However, in the absence of row electrodes 24, the optical properties of each region 19a to 19g cannot vary along the direction of the column electrodes 23a to 23g. This means that only one type of image can be presented by a display panel 2 that is backlit using such a waveguide, prohibiting the presentation of, for example, a 3D image within a window surrounded by a 2D image, as shown in FIGS. 7 and 8.

Although FIG. 9 shows an arrangement in which the unstructured electrode 24a and column electrodes 22a to 22f, 23a to 23g are provided by ITO layers 20 and 21 respectively, the electrode structures may be interchanged in an alternative embodiment, so that the ITO layer 20 provides the array of column electrodes 22a to 22f, 23a to 23g and ITO layer 21 constitutes the single electrode 24a.

Figure 10:
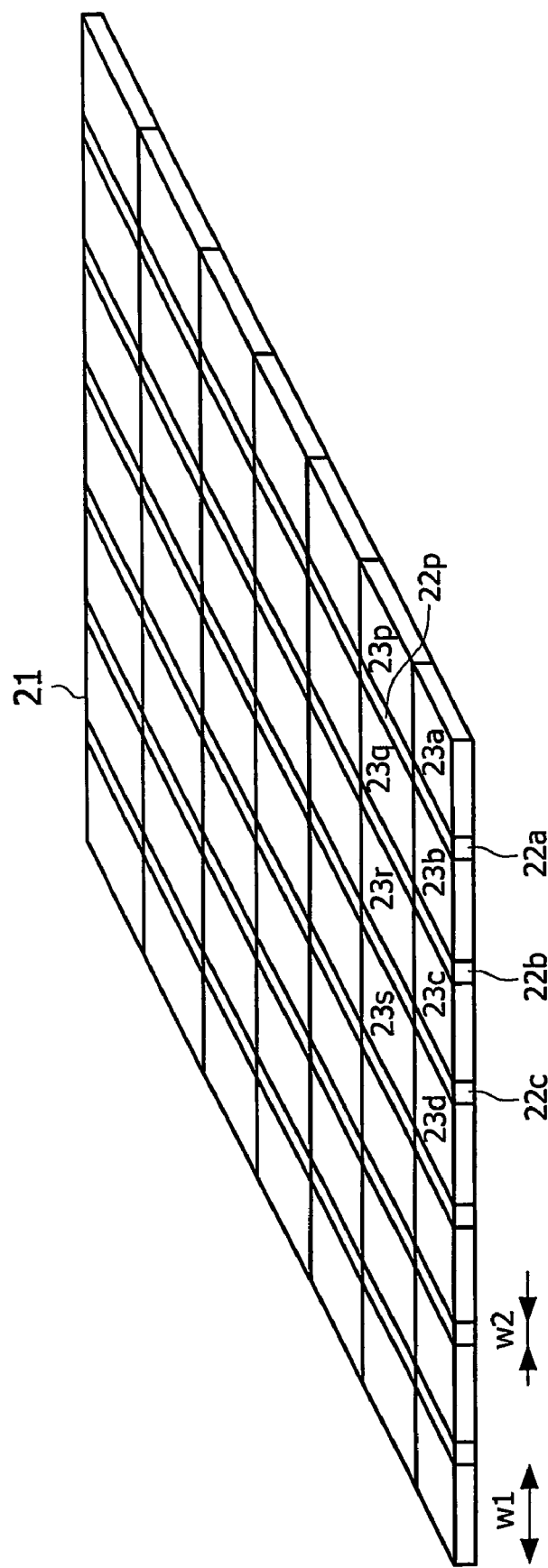
FIG. 10 shows part of an electrode structure for use in a waveguide according to a fourth embodiment of the invention.

In the second embodiment discussed above, the drive unit 25 applies voltages to row electrodes 24 and column electrodes 22a to 22f, 23a to 23g using passive matrix addressing. However, in a fourth embodiment of the invention, regions 10a to 10f, 19a to 19g of the diffusive layer 19 are addressed using an active matrix. FIG. 10 depicts an ITO layer 21 provided on a substrate 12. The substrate 12 may be used in place of that shown in the waveguide 18 of FIG. 3.

The ITO layer 21 is divided into pixels, forming a two-dimensional array of electrodes 22a to 22c, 22p, 23a to 23c, 23p to 23s. The pixel electrodes 22a to 22c, 22p, 23a to 23c, 23p to 23s have one of two widths w1, w2, depending on their location, in a similar manner to the column electrodes 22a to 22f, 23a to 23g of FIG. 4.

Figure 11:
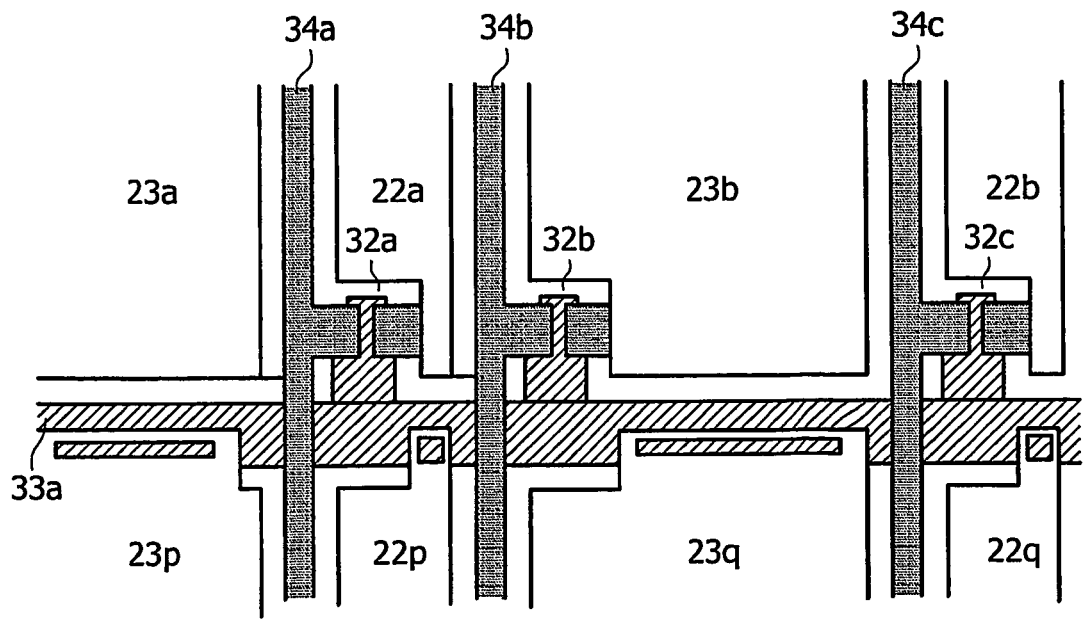
FIG. 11 depicts an active matrix arrangement for use with the electrode structure of FIG. 10.

With reference to FIG. 11, the substrate 12 also carries an array of transistors, such as back-channel etched thin film transistors (TFTs) 32a, 32b, 32c and a plurality of capacitors (not shown), where one TFT 32a, 32b, 32c and one capacitor is associated with each pixel electrode 22a, 22b, 22p, 22q, 23a, 23b, 23p, 23q. A matrix of row electrodes 33a and column electrodes 34a, 34b formed from a transparent material, such as ITO, is provided. In order to apply a voltage to a selected pixel electrode 23b, TFT 32a is activated by a voltage applied to a row electrode 33a, causing its associated capacitor to be charged up according to the voltage on column electrode 34b. The accumulated voltage is then supplied to a pixel electrode 23b, in order to switch part of region 19b of the diffusive layer 19 into a diffusive state.

The provision of an active matrix arrangement provides greater flexibility in allowing the creation of illumination for several 3D image windows simultaneously, so that a plurality of 3D images may be displayed simultaneously with one or more 2D images.

In addition, as voltages are applied to each diffusive region 19a, 19g individually, a given region 19a may be tuned to a particular scattering strength, independently of the other regions 19b to 19g. Such a feature may be used to provide dissimilar levels of illumination to different parts of the display panel 2 simultaneously, for example, to compensate for variations in brightness and/or contrast in different parts of the display panel 2.

The surfaces of the waveguides 9, 18 of the first to fourth embodiments are not provided with reflective coatings and so, as light is scattered in random directions by diffusing portions 10a to 10f and, in the second embodiment, switchable portions 19a to 19g, a significant fraction of the light may leave the waveguide through a surface other than the exit face 15. For example, light may leave through face 16 of substrate 12, or through an end face, such as end face 13. This light cannot be recovered without causing deterioration in the contrast of the light lines. A fifth embodiment of the invention, which can achieve a higher light efficiency than the waveguides 9, 18 of the first to fourth embodiments, while maintaining the contrast achieved by the light lines, is illustrated in FIG. 12.

Figure 12:
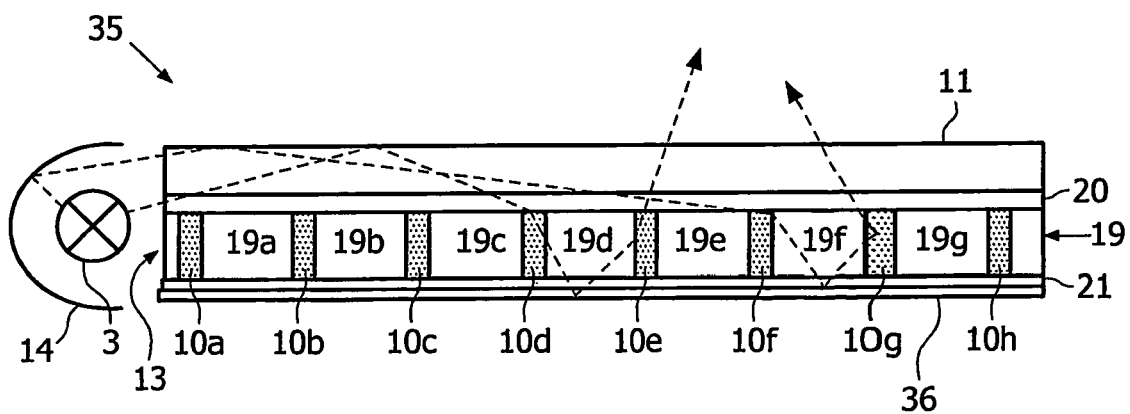
FIG. 12 is a schematic diagram of a display comprising a waveguide according to a fifth embodiment of the invention.

In FIG. 12, a waveguide 35 according to a fifth embodiment of the invention comprises a first substrate 11, diffusive portions 10a to 10h, a diffusing layer 19 and ITO layers 20, 21 arranged into row and column electrodes 22a to 22f, 23a to 23g, 24 as described in relation to the second embodiment. However, in place of substrate 12, a light-reflective surface 36 is provided in order to recover light that is scattered by a part of the diffusing layer 19 in a direction away from the exit face 15. As the diffusing layer 19 is situated close to the light-reflective surface 36, a pattern of light lines with a reasonable contrast can be maintained.

A similar configuration can be used for a non-switchable waveguide. A waveguide (not shown) may be formed using a first substrate 11, together with a reflective surface 36 as in FIG. 12, and non-switchable diffusing portions 10a to 10f as discussed in relation to the first embodiment, shown in FIG. 2. This configuration achieves similar advantages to those described in relation to the third embodiment.

Figure 1:
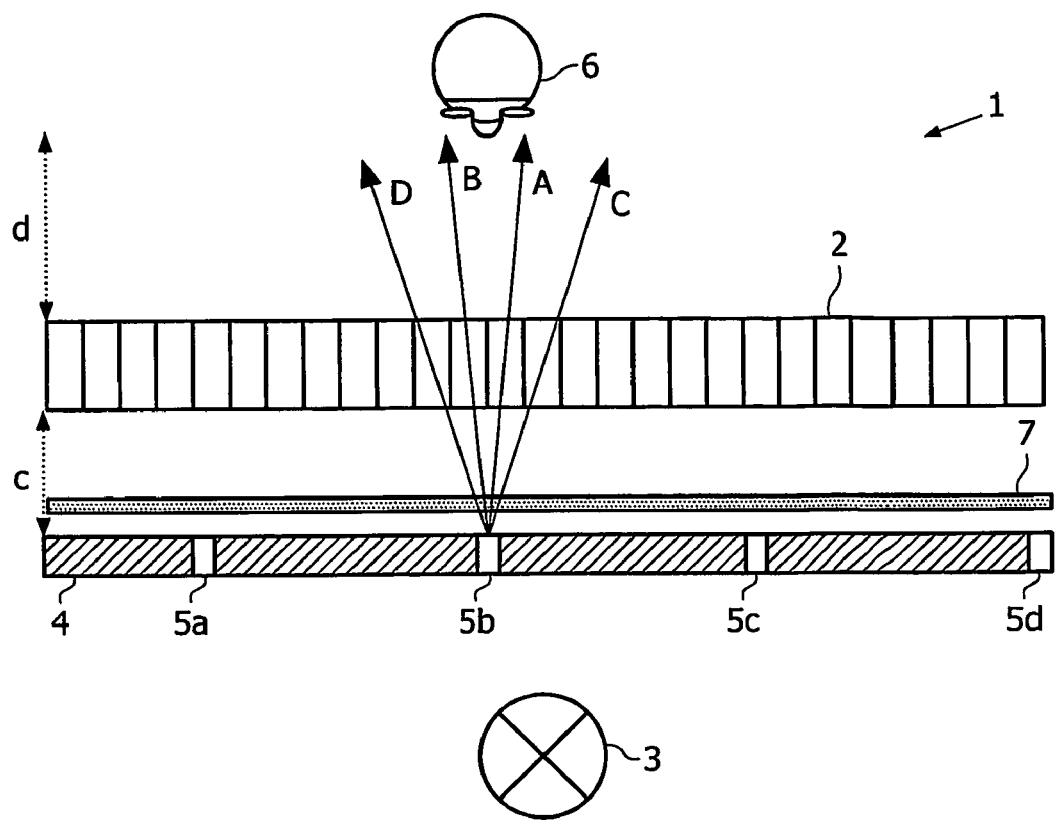
FIG. 1 is a schematic diagram of a known autostereoscopic display arrangement for producing multiple views of an image.

The 3D images produced by a display 8, 17 comprising a waveguide 9, 18, 35 according to one of the first to fifth embodiments can only be viewed from a limited number of predetermined positions, that is, a viewer must be located at a position in which the appropriate images A, B, or A, B, C, D, can be registered correctly, as shown in the prior arrangement of FIG. 1. If the viewer should move sideways, the correct pair of images may not be perceived as the light lines and image would not be correctly aligned. The viewer may move towards, or away from, the display panel 2. Alternatively, the direction of the viewers gaze may no longer be perpendicular to the display panel 2.

Figure 13:
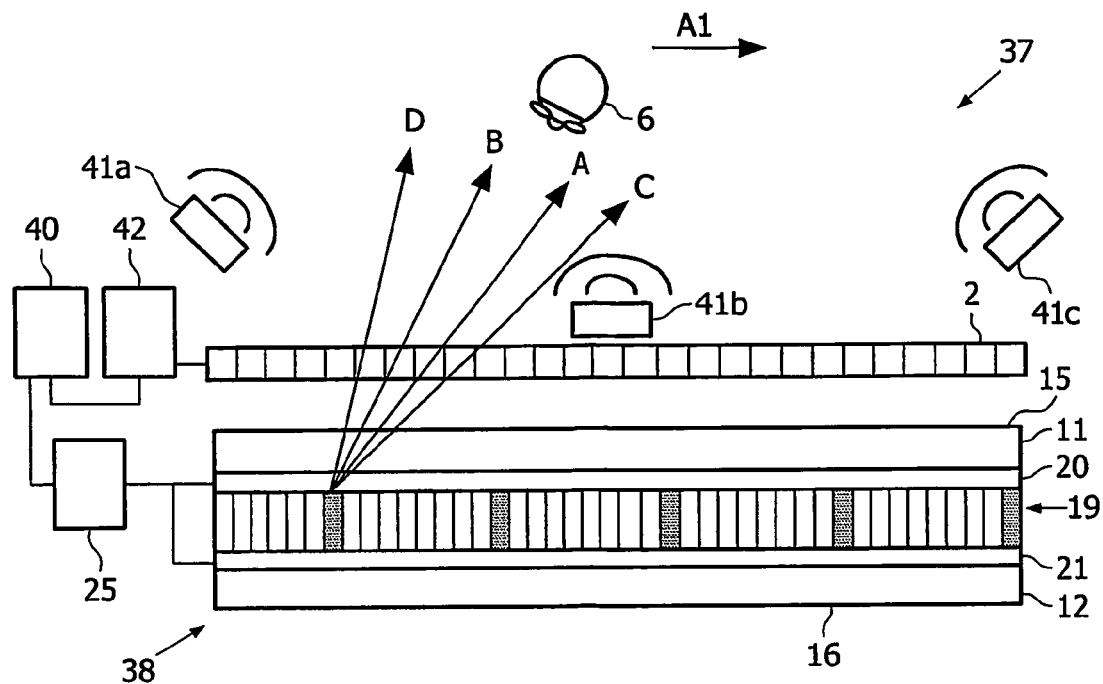
FIG. 13 is a schematic diagram of a display comprising a waveguide according to a sixth embodiment of the invention.

FIG. 13 depicts a display 37 comprising a waveguide 38 according to a sixth embodiment of the invention, configured to compensate for movement of a viewer.

Figure 14:
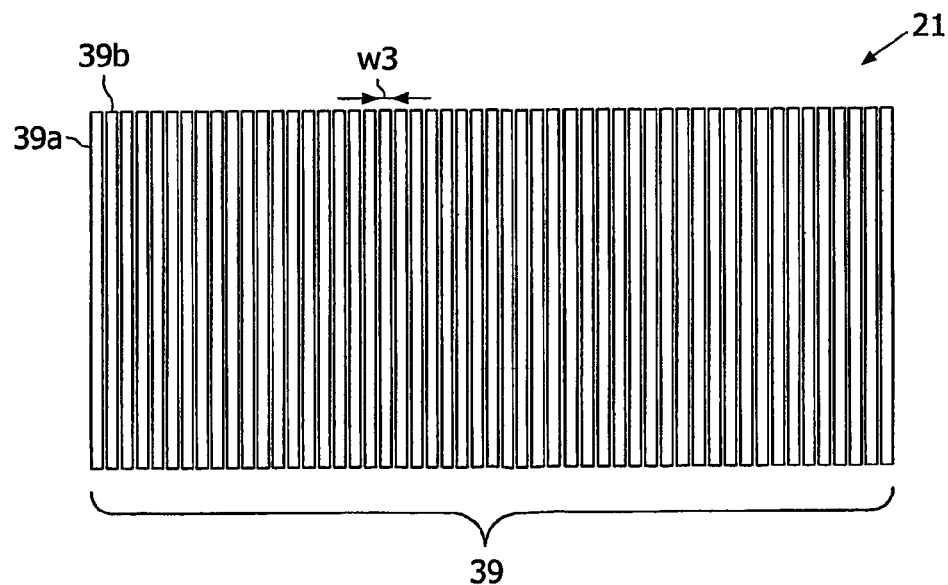
FIG. 14 is a plan view of an electrode structure used in the waveguide of FIG. 13.

The waveguide 38 differs from the waveguide 18 of the second embodiment in the arrangement of column electrodes provided in ITO layer 21. As shown in FIG. 14, an array 39 of column electrodes 39a, 39b and so on, having substantially similar physical dimensions, is provided. In this example, the column electrodes 39a, 39b have widths w3 of approximately 50 µm. The other ITO layer 20 may provide a single unstructured electrode or an array of row electrodes.

A tracking arrangement comprising a processor 40 and tracking devices is provided for determining the position of a viewer 6. In this particular example, the tracking devices are three ultrasonic transducers 41a, 41b, 41c. The transducers 41a, 41b, 41c are positioned at spatial intervals in the vicinity of or, if required, within, the display 37. The processor 40 causes one of the ultrasonic transducers 41b to emit an ultrasound pulse and receives output signals from the transducers 41a, 41c generated in response to the detection of echoes caused by reflection of the pulse by the viewer. The times at which the echoes were received and their intensity are analysed by the processor 40 in order to determine the position of the viewer 6. The processor 40 determines an appropriate pattern of light lines required to display a 3D image to the viewer 6. The processor 40 sends a control signal to the drive unit 25, which applies voltages through selected groups of electrodes 39a, 39b, switching parts of the diffusive layer 19 into a diffusive state, in order to produce the required light pattern. in FIG. 13.

A second control signal is sent by the processor 40 to an image processor 42. In response to the second control signal, the image processor 42 adjusts the image to be displayed in accordance with the viewer position. For example, the images displayed by each column of pixels may be manipulated in order to compensate for the viewer having an oblique view of the display panel 2, as shown in FIG. 13.

In this manner, if it is determined that the viewer 6 is moving across the display panel, for example, in a direction indicated by arrow A1, the image presented on the display panel 2 and its illumination is adjusted accordingly.

Alternative sensors for detecting the position or movement of the viewer 6 may be provided in place of the ultrasonic transducers 41a, 41b, 41c. One suitable alternative uses a single camera that monitors a viewing zone in front of the display panel 2. In such an embodiment, the processor 40 is equipped with software for determining the position of the viewer or his eyes from images recorded by the camera.

In another embodiment of the invention, a display substantially similar to that shown in FIG. 13 may be provided, where the waveguide comprises an array of column electrodes, similar to the array 39 of FIG. 14, where the widths of the column electrodes, equivalent to 39a, 39b etc., are less than the width of a light line, where an electric field may be applied to a diffusing layer using a plurality of adjacent column electrodes in order to provide each diffusive portion. For example, a width of approximately one fifth of the width of the light lines would be suitable, so that column electrodes with a width of 2 µm would be used in a waveguide configured to produce light lines of 10 µm width. Similarly, column electrodes of width 160 µm could be used in a waveguide configured to produce light lines of 800 µm width. Such a display can respond to a determination by a tracking arrangement that the viewer 6 has moved away from, or towards, the display panel by increasing or decreasing the pitch of the light lines respectively. This is achieved by applying voltages to a suitable number of column electrodes in order to switch portions of the diffusive layer into a diffusive state in order to produce light lines with the required spacing. The image displayed by the display panel may also be adjusted in accordance with the detected viewer position.

From reading the present disclosure, other variations and modifications will be apparent to persons skilled in the art. Such variations and modifications may involve equivalent and other features which are already known in the design, manufacture and use of electronic devices comprising liquid crystal displays, alternative display devices or transflectors and component parts thereof and which may be used instead of or in addition to features already described herein.

For example, the substrates 11, 12, diffusing layer 19, layers 20, 21 and, therefore, electrodes 22, 23, 24, 24a, 33a, 34, 39 may be provided using suitable materials other than those mentioned above. For example, the electrodes 22, 23, 24, 24a, 33a, 34, 39 may be formed using a transparent electrically conductive film of a material other than ITO, such as tin oxide ($SnO_2$).

Although the examples described relate to displays comprising an LCD display panel 2, a waveguide according to the invention may be used to illuminate other types of display panel 2, including micromechanical displays.

As noted above, the column electrodes in the waveguides of the second, third, fifth and sixth embodiments described above may be provided by either one of the ITO layers 20, 21, with a complementary electrode, that is, a single unstructured electrode 24a or an array or row electrodes 24 being provided on the other of the ITO layers 20, 21. Similarly, the active matrix described in relation to the fourth embodiment may be provided on. substrate 11, instead of substrate 12.

While the second, third, fifth and sixth embodiments described above refer to a diffusing layer 19 controlled using a passive matrix arrangement, an active matrix arrangement may instead be used to tune portions of a diffusing layer 19 in a similar manner discussed in relation to the electrode structure shown in FIGS. 10 and 11.

While FIG. 8 depicted a PDA 26 comprising a display and waveguide according to the invention, the display may be used in other devices. The display may be incorporated in, for example, mobile telephones and other communication devices, games consoles and devices, televisions, automotive displays and displays for audio/visual or computing equipment, whether fixed or portable.

Although Claims have been formulated in this Application to particular combinations of features, it should be understood that the scope of the disclosure of the present invention also includes any novel features or any novel combination of features disclosed herein either explicitly or implicitly or any generalisation thereof, whether or not it relates to the same invention as presently claimed in any Claim and whether or not it mitigates any or all of the same technical problems as does the present invention. The Applicants hereby give notice that new Claims may be formulated to such features and/or combinations of such features during the prosecution of the present Application or of any further Application derived therefrom.

The invention claimed is:

1. A waveguide for use in illuminating a display panel, comprising:
a first face arranged to receive light from a light source; and
an exit face through which light may exit the waveguide;
configured so that, in use, light enters the waveguide through said first face, is scattered by a plurality of portions of diffusing material located within the waveguide and leaves the waveguide through said exit face; thereby illuminating the display panel;
wherein at least one of said plurality of portions can be switched between a state in which said portion is predominantly light-transmissive and a state in which said part is predominantly diffusive.

2. The waveguide according to claim 1, wherein the light leaving the waveguide through the exit face forms a pattern of light lines.

3. The waveguide according claim 1, further comprising a plurality of electrodes, wherein said at least one portion is configured to respond to the application of an electric field through said electrodes by switching from one of said light-transmissive state and said diffusive state to the other of said light-transmissive state and said diffusive state.

4. The waveguide according to claim 3, wherein light passing through a first region of the exit face produces uniform illumination within a first area, while light passing through a second region of the exit face produces a pattern of light lines within a second area.

5. The waveguide according to claim 4, wherein said plurality of electrodes comprises a set of column electrodes.

6. The waveguide according to claim 5, wherein said plurality of electrodes further comprises a set of row electrodes.

7. The waveguide according to claim 4, wherein said plurality of electrodes comprises a two dimensional array of electrodes.

8. The waveguide according to claim 7, further comprising an active matrix.

9. The waveguide according to claim 1, comprising a reflective surface, wherein said reflective surface is arranged to reflect light scattered by at least one portion in a direction leading away from the exit face.

10. The display comprising: a display panel; and
an illumination system arranged to illuminate the display panel, comprising a light source and a waveguide according to claim 1.

11. A communications device comprising a display according to claim 10.

12. A computing device comprising a display according to claim 10.

13. An audio/visual equipment comprising a display according to claim 10.

14. A waveguide for use in illuminating a display panel, comprising:
a first face arranged to receive light from a light source; and
an exit face through which light may exit the waveguide;
configured so that, in use, light enters the waveguide through said first face, is scattered by a plurality of portions of diffusing material located within the waveguide and leaves the waveguide through said exit face; thereby illuminating the display panel;
wherein the diffusing material comprises a liquid crystal.

15. The waveguide according to claim 14, wherein the diffusing material is a liquid crystal gel.

16. A display comprising:
a display panel; and
an illumination system arranged to illuminate the display panel, comprising a light source and a waveguide for illuminating the display panel;
wherein the waveguide comprises:
a first face arranged to receive light from a light source; and
an exit face through which light may exit the waveguide;
configured so that, in use, light enters the waveguide through said first face, is scattered by a plurality of portions of diffusing material located within the waveguide and leaves the waveguide through said exit face;
and wherein at least one of said portions can be switched between a state in which said part is predominantly light-transmissive and a state in which said part is predominantly diffusive so that light leaving the exit face forms a pattern of light lines, comprising:
an arrangement for determining the position of a viewer;
means for switching one or more of the portions in order to vary the position of the light lines according to the detected position of the viewer; and
means for adjusting an image displayed on the display panel according to the detected position of the viewer.

17. A method of presenting an image comprising the acts of:
displaying an image on a display panel; and
illuminating the display panel using a light source and a waveguide;
wherein said waveguide comprises a layer of diffusive material and the act of illuminating backlighting comprises the act of setting optical properties of at least one portion of the layer of diffusive material; and
wherein the act of setting optical properties comprises applying a potential difference across said at least one portion.

18. The method according to claim 17, wherein the step of setting optical properties comprises switching at least one portion of the layer of diffusive material between a state in which said portion is predominantly light-transmissive and a state in which said portion is predominantly diffusive.

19. The method according to claim 17, wherein the optical properties of said portions are set so that said illuminating comprises a plurality of light lines and said image is a 3D image.

20. The method according to claim 17, wherein the optical properties of said portions are set so that uniform illumination is produced and said image is a 2D image.

21. The method according to claim 17, comprising switching said at least one portion between a first mode, in which a plurality of light lines is produced for illuminating a 3D image, and a second mode in which uniform illumination is produced for illuminating a 2D image.

22. The method according to claim 19, wherein said illuminating illuminates a first area of the display panel with uniform illumination and a second area of the display panel with the plurality of light lines, the image being displayed on the display panel comprising a 2D image within said first area and a 3D image within said second area.

23. A method of presenting an image comprising:
  displaying an image on a display panel; and
  providing backlighting for the display panel using a light source and a waveguide;
  wherein said waveguide comprises a layer of diffusive material and the step of providing backlighting comprises setting optical properties of at least one portion of the layer of diffusive material; and wherein the optical properties of said at least one portion are set so that said backlighting comprises a plurality of light lines and said image is a 3D image; and,
  determining a position of a viewer and adjusting said pattern of light lines and said image according to the determined viewer position.

* * * * *